United States Patent [19]

Adamson

[11] Patent Number: 4,894,203
[45] Date of Patent: Jan. 16, 1990

[54] NUCLEAR FUEL ELEMENT HAVING OXIDATION RESISTANT CLADDING

[75] Inventor: Ronald B. Adamson, Fremont, Calif.

[73] Assignee: General Electric Company, San Jose, Calif.

[21] Appl. No.: 152,507

[22] Filed: Feb. 5, 1988

[51] Int. Cl.⁴ .............................................. G21C 3/00
[52] U.S. Cl. .................................. 376/416; 376/414; 376/417
[58] Field of Search .................... 376/414, 416, 417; 148/6.3, 6.31, 6.35

[56] References Cited

U.S. PATENT DOCUMENTS

| | | | |
|---|---|---|---|
| 4,022,662 | 5/1977 | Gordon et al. | 376/416 |
| 4,029,545 | 6/1977 | Gordon et al. | 376/416 |
| 4,045,288 | 8/1977 | Armijo | 376/416 |
| 4,200,492 | 4/1980 | Armijo et al. | 176/82 |
| 4,229,260 | 10/1980 | Johnson et al. | 376/416 |
| 4,372,817 | 2/1983 | Armijo et al. | 376/417 |
| 4,406,012 | 9/1983 | Gordon | 376/414 |
| 4,445,942 | 5/1984 | Cheng | 148/6.3 |

FOREIGN PATENT DOCUMENTS 0155603 9/1985 European Pat. Off. .
2119559A 11/1983 United Kingdom .

Primary Examiner—Donald P. Walsh
Attorney, Agent, or Firm—Robert R. Schroeder; William M. Hynes; James M. Heslin

[57] ABSTRACT

Nuclear fuel elements for use in the core of a nuclear reactor include an improved composite cladding having a zirconium barrier layer metallurgically bonded on the inside surface of a zirconium alloy tube, wherein the inside surface of the barrier is alloyed with preselected elemental impurities to improve oxidation resistance. The zirconium barrier layer forms a shield between the zirconium alloy tube and a core of nuclear fuel material enclosed in the composite cladding. The alloy layer formed on the barrier surface acts to inhibit cracking during the tube production fabrication step and limits oxidation in the event that the cladding is breached during operation of the reactor, allowing the entrance of water or steam into the fuel element.

10 Claims, 1 Drawing Sheet

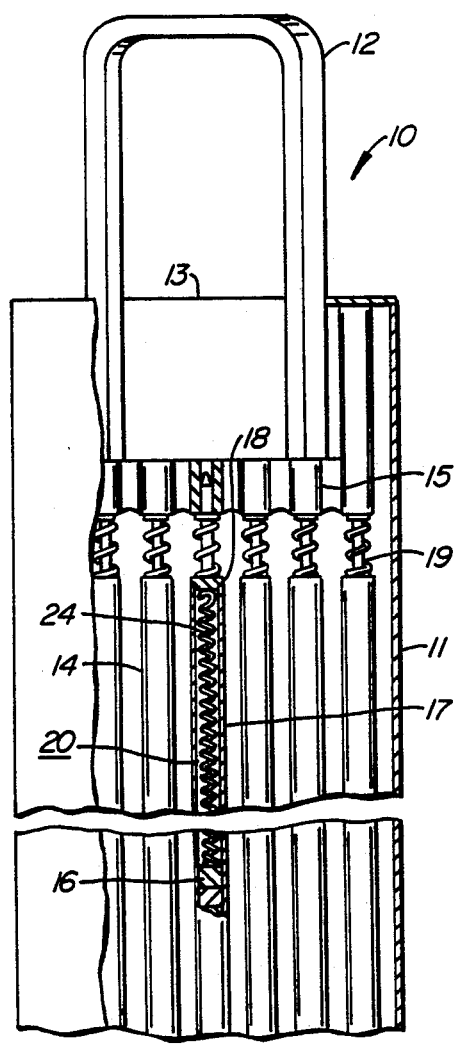
Fig._1.
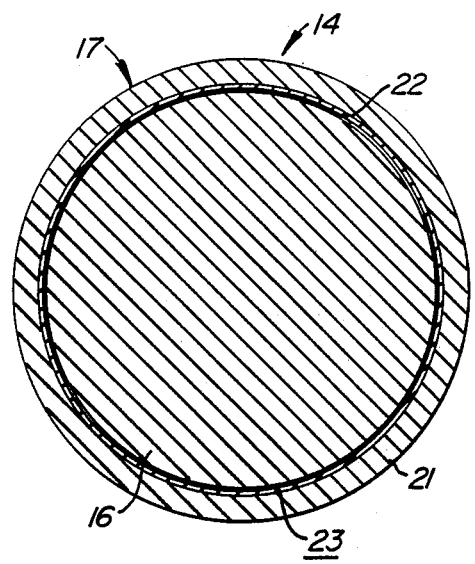
Fig._2.
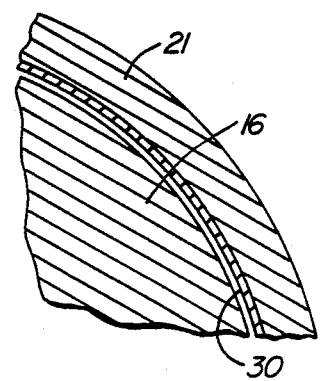
Fig._3.

NUCLEAR FUEL ELEMENT HAVING OXIDATION RESISTANT CLADDING

BACKGROUND OF THE INVENTION

This invention relates broadly to nuclear fuel elements having a composite cladding comprised of a metal barrier of sponge or crystal bar zirconium bonded to the inside surface of a zirconium alloy tube, and more particularly to such a composite cladding having improved strength and oxidation resistance.

Nuclear reactors are presently being designed, constructed and operated in which the nuclear fuel is contained in fuel elements which can have various geometric shapes, such as plates, tubes, or rods. The fuel material is usually enclosed in a corrosion-resistant, nonreactive heat-conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core, in turn, is enclosed within a reactor vessel through which a coolant is passed.

The cladding serves several purposes and two primary purposes are: first, to prevent contact and chemical reactions between the nuclear fuel and the coolant or the moderator if a a moderator is present, or both if both coolant and moderator are present; and second, to prevent the radioactive fission products, some of which are gases, from being released from the fuel into the coolant or the moderator or both if both coolant and moderator are present Useful cladding materials include stainless steel, aluminum and its alloys, zirconium and its alloys, certain magnesium alloys, and others. The failure of the cladding, i.e., a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical stresses or chemical reactions occurring with these cladding materials under certain circumstances. Zirconium and its alloys, under normal circumstances, are excellent nuclear fuel claddings since they have low neutron absorption cross sections and at temperatures below about 750° F. (about 398° C.) are strong, ductile, extremely stable and nonreactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this undesirable performance is due to localized mechanical stresses on the fuel cladding resulting from differential expansion and friction between the fuel and the cladding. Fission products are created in the nuclear fuel by the fission chain reaction during operation of a nuclear reactor, and these fission products are released from the nuclear fuel and are present at the cladding surface These localized stresses and strain in the presence of specific fission products, such as iodine and cadmium, are capable of producing cladding failures by phenomena known as stress corrosion cracking and liquid metal embrittlement.

Within the confines of a sealed fuel element, hydrogen gas can be generated by the slow reaction between the cladding and residual water inside the cladding, and this hydrogen gas may build up to levels which, under certain conditions, can result in localized hydriding of the cladding, with concurrent localized deterioration in the mechanical properties of the cladding. The cladding may also be adversely affected by such gases as oxygen, nitrogen, carbon monoxide and carbon dioxide over a wide range of temperatures.

The zirconium cladding of a nuclear fuel element is exposed to one or more of the gases listed above and fission products during irradiation in a nuclear reactor, and this occurs in spite of the fact that these gases may not be present in the reactor coolant or moderator and further, may have been excluded as far as possible from the ambient atmosphere during manufacture of the cladding and the fuel element. Sintered refractory and ceramic compositions, such as uranium dioxide, and other compositions used as nuclear fuel, release measurable quantities of the aforementioned gases upon heating, such as during fuel element manufacture and further release fission products during nuclear fission chain reactions. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

Thus, in light of the foregoing, it has been found desirable to minimize attack on the zirconium cladding from water, water vapor and gases, especially hydrogen, reactive with the cladding from inside the fuel element throughout the time the fuel element is used in the operation of nuclear power plants.

Two particularly effective approaches for inhibiting the degradation of zirconium and zirconium alloy nuclear fuel cladding tubes are described in U.S. Pat. Nos. 4,200,492 and 4,372,817, the disclosures of which are incorporated herein by reference. A composite cladding tube described therein comprises a barrier layer of either high purity zirconium (such as crystal bar zirconium) or moderate purity zirconium (such as sponge zirconium) metallurgically bonded on the inside surface of a zirconium alloy tube. The composite cladding encloses the nuclear fuel material, leaving a gap between the fuel and the cladding. The barrier layer shields the alloy tube from the nuclear fuel material held in cladding as well as shielding the alloy tube from fission products and gases. The barrier layer typically has a thickness equal to about 1 to about 30 percent of the thickness of the composite cladding. In both caes, the barrier layer remains relatively soft during irradiation and minimizes localized strain inside the nuclear fuel element, thus serving to protect the alloy tube from both stress corrosion cracking and liquid metal embrittlement. The alloy tube portion of the cladding is otherwise unchanged in design and function from previous practice for a nuclear reactor and is selected from conventional cladding materials, such as zirconium alloys.

It is disclosed in U.S. Pat. Nos. 4,200,492 and 4,372,817 that the high and moderate purity zirconium metal forming the metal barrier in the composite cladding, even after prolonged irradiation, is able to maintain desirable structural properties such as yield strength and hardness at levels considerably lower than those of conventional zirconium alloys. In effect, the metal barrier does not harden as much as conventional zirconium alloys when subjected to irradiation, and this together with its initially low yield strength enables the metal barrier to deform plastically and relieve pellet-induced stresses in the fuel element during power transients. Pellet induced stresses in the fuel element can be brought about, for example, by swelling of the pellets of nuclear fuel at reactor operating temperatures (300° to 350° C.) so that the pellet comes into contact with the cladding.

The nuclear fuel elements described in U.S. Pat. Nos. 4,200,492 and 4,372,817 are a substantial improvement over elements which do not include internal zirconium barrier layers. Certain problems, however, are encountered in the fabrication and utilization of such nuclear fuel elements. First, the softness and large grain size of the zirconium sponge barrier layer has been found to promote surface cracking, or microfissuring, during the fabrication of the composite cladding, particularly during the stage where the tube shell is formed into the tubing. The microfissures can extend up to 10 microns into the zirconium barrier layer (which is typically about 75 microns thick), serving as initiation sites for stress corrosion cracking. Second, the relatively pure zirconium liners will oxidize rapidly if the composite cladding is breached and water or steam enters the fuel rod during operation of the reactor.

It would thus be desirable to provide an improved nuclear fuel rod of the type generally disclosed in U.S. Pat. Nos. 4,200,492 and 4,372,817, wherein the tendency of the relatively pure zirconium barrier layer to crack during fabrication and oxidize during operation are largely inhibited. It would be particularly desirable if such cracking and oxidation inhibition can be achieved without reducing the effectiveness of the zirconium barrier layer, particularly the ability of the barrier layer to deform plastically and relieve pellet-induced stresses in the fuel element during power transients.

SUMMARY OF THE INVENTION

Improved nuclear fuel elements of the type including a zirconium alloy tube, a barrier of high or moderate purity zirconium metallurgically bonded to the inside surface of the tube, and a central core of nuclear fuel material partially filling the tube so as to leave a gap between the sponge zirconium layer and the nuclear fuel material are provided. The improvement comprises an alloy layer formed on the inside surface of the zirconium barrier, where the alloy is selected to inhibit crack formation during fabrication and oxidation of the zirconium barrier during operation without substantially affecting the desired plastic properties of the barrier. The alloy layer will typically have a thickness in the range from about 0.01 to 1.0 microns, where the zirconium alloy tube has a thickness in the range from about 500 to about 1000 microns and the zirconium barrier has a thickness in the range from about 25 to 100 microns. The alloy will typically be formed by ion implantation, ion plating, chemical vapor deposition of impurities selected from the group consisting of iron, chromium, copper, nitrogen, and niobium. A particularly preferred alloy composition including each of these elements is described hereinafter.

BRIEF DESCRIPTION OF THE DRAWINGS

FIG. 1 is a partial cutaway sectional view of a nuclear fuel assembly containing nuclear fuel elements constructed according to the present invention FIG. 2 is an enlarged cross-sectional view of the nuclear fuel element of the present invention.

FIG. 3 is an enlarged detail view from FIG. 2 illustrating the location of the alloy layer of the present invention.

DESCRIPTION OF THE INVENTION

Referring now more particularly to FIG. 1, there is shown a partially cutaway sectional view of a nuclear fuel assembly 10. This fuel assembly consists of a tubular flow channel 11 of generally square cross section provided at its upper nd with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements 14 (also commonly referred to as fuel rods) is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 4, and discharges at upper outlet 13 in a partially vaporized condition for boiling reactors or in an unvaporized condition for pressurized reactors at an elevated temperature.

The nuclear fuel elements 14 are sealed at their ends by means of end plugs 18 welded to a cladding container 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restrain against the axial movement of a fuel material core 16, especially during handling and transportation of the fuel element.

The fuel element 14 is designed to provide excellent thermal contact between the cladding tube 17 and the fuel material core 16, a minimum of parasitic neutron absorption, and resistance to bowing and vibration which is occasionally caused by flow of the coolant at high velocity.

The fuel material core 16 is typically a plurality of fuel pellets of fissionable and/or fertile material positioned within the cladding container 17. In some cases, the fuel pellets may be of various shapes, such as cylindrical pellets or spheres, and in other cases, different fuel forms such as particulate fuel may be used. The physical form of the fuel is immaterial to this invention. Various nuclear fuel materials may be used, including uranium compounds, plutonium compounds, thorium compounds and mixtures thereof. A preferred fuel is uranium dioxide or a mixture comprising uranium dioxide and plutonium dioxide.

Referring now to FIG. 2, the nuclear fuel material 16 forming the central core of the fuel element 14 is surrounded by the cladding container 17, which is a composite cladding. The composite cladding container 17 encloses the core 16 so as to leave a gap 23 between the core and the cladding container during use in a nuclear reactor. The composite cladding container 17 is comprised of a zirconium alloy tube 21 which in a preferred embodiment of this invention is made of Zircaloy-2. The alloy tube 21 has bonded on the inside surface thereof a zirconium barrier layer 22 so that the barrier layer 22 forms a shield between the alloy tube 21 and the nuclear fuel material 16 held in the cladding 22. The barrier layer 22 forms about 1 to about 30 percent of the thickness of the cladding and is characterized by low neutron absorption. The zirconium barrier 22 protects the zirconium alloy tube portion of the cladding from contact and reaction with gases and fission products and prevents the occurrence of localized stress and strain.

Suitable zirconium barrier layers 22 include both high purity (e.g., crystal bar) zirconium and moderate purity (e.g., sponge) zirconium, as described in U.S. Pat. Nos. 4,200,492 and 4,372,817, respectively.

The high purity zirconium will have an impurity content less than about 500 ppm, with the oxygen content being less than about 200 ppm, preferably being less than 100 ppm.

The composition of the zirconium sponge barrier 22 is selected to impart special properties to the barrier. Generally, there is at least about 1000 parts per million (ppm) by weight and less than about 5000 ppm impurities in the material of the barrier 22 and preferably less than about 4200 ppm. Of these, oxygen is kept within the range of about 200 to about 1200 ppm. All other impurities are within the normal range for commercial, reactor grade sponge zirconium and are listed as follows: aluminum - 75 ppm or less; boron - 0.4 ppm or less; cadmium - 0.4 ppm or less; carbon - 270 ppm or less; chromium - 200 ppm or less; cobalt - 20 ppm or less; copper - 50 ppm or less; hafnium - 100 ppm or less; hydrogen - 25 ppm or less; iron - 1500 ppm or less; magnesium - 20 ppm or less; manganese - 50 ppm or less; molybdenum - 50 ppm or less; nickel - 70 ppm or less; niobium - 100 ppm or less; nitrogen - 80 ppm or less; silicon - 120 ppm or less; tin - 50 ppm or less; tungsten - 100 ppm or less; titanium - 50 ppm or less; and uranium - 3.5 ppm or less.

The composite cladding 17 of the nuclear fuel element 14 of this invention has the barrier 22 bonded to the zirconium alloy tube 21 by a strong bond. There should be sufficient diffusion between the materials of the tube 21 and the barrier 22 to form a bond, but no diffusion to any extent away from the area of the bond. A barrier 22 of sponge zirconium of the order preferably about 5 to 15 percent of the thickness of the cladding 17 and a particularly preferred thickness of 10 percent of the cladding bonded to the alloy tube of a zirconium alloy provides stress reduction and a barrier effect sufficient to prevent failures in the composite cladding.

Among the zirconium alloys serving as suitable alloy tubes 21 are Zircaloy-2 and Zircaloy-4 Zircaloy-2 has on a weight basis about 1.5 percent tin; 0.12 percent iron; 0.09 percent chromium and 0.05 percent nickel and is extensively employed in water-cooled reactors. Zircaloy-4 has less nickel than Zircaloy-2 but contains slightly more iron than Zircaloy-2.

The composite cladding 17 used in the nuclear fuel elements 14 of this invention can be fabricated by any of the following methods.

In one method, a hollow collar of the sponge zirconium selected to be the barrier 22 is inserted into a hollow billet of the zirconium alloy selected to be the alloy tube. The assembly is subjected to explosive bonding of the collar to the billet. The composite is extruded at an elevated temperature of about 1000° to about 1400° F. (about 538° to about 750° C.) using conventional tube shell extrusion techniques. The extruded composite is then subjected to a process involving conventional tube reduction until the desired size of cladding is achieved.

In another method, a hollow collar of the sponge zirconium selected to be the barrier 22 is inserted into a hollow billet of the zirconium alloy selected to be the alloy tube and then the assembly is subjected to a heating step, typically at 750° C. for about 8 hours, to give diffusion bonding between the collar and the billet. The composite is then extruded using conventional tube shell extrusion techniques and the extruded composite is subjected to a process involving conventional tube reduction until the desired size of cladding is achieved.

In still another method, a hollow collar of the sponge zirconium selected to be the barrier 22 is inserted into a hollow billet of the zirconium alloy selected to be the alloy tube and the assembly is extruded using conventional tube shell extrusion techniques. Then the extruded composite is subjected to a process involving conventional tube reduction until the desired size of cladding 17 is achieved.

Up until this point, the fabrication method for the fuel element cladding container 17 has been as described in U.S. Pat. No. 4,200,492. The present invention provides a modification of the previously-patented process which involves alloying a thin layer of the zirconium barrier layer 22 with one or more metal impurities which are capable of inhibiting oxidation of the barrier during operation and preventing mechanical damage to the barrier during fabrication. Impurities which will form the desired alloys include small amounts of iron, chromium, copper, nitrogen, and niobium. The alloy layer will be formed on the inner surface of the zirconium barrier layer 22 (shown at reference numeral 30 in FIG. 3) by introducing preselected amounts of the impurities. The impurities may be introduced by any conventional method which allows control of the depth of deposition. Particularly suitable are techniques such as ion implantation, ion plating, chemical vapor deposition, and the like. The thickness of the alloy layer is not critical, and will depend on precise composition of the alloy. Thickness should be sufficient to provide the desired mechanical protection and oxidation resistance which are the objects of the present invention. Typically, the alloy layer will have a thickness in the range from about 0.01 to 1.0 microns, more usually being in the range from about 0.01 to 0.1 microns.

The impurities which form the alloy will be present in the alloy layer (which is only a fraction of the zirconium sponge layer), in relatively low amounts, typically being present at less than 1% by weight, more typically being present at from about 0.01 to 0.75% by weight. The particularly preferred alloy layer of the present invention will include each of the elemental impurities in the amounts set forth in the following Table 1, below. It should be understood that additional impurities may also be introduced so long as their introduction does not diminish the desired oxidation resistance of the alloy layer.

TABLE 1

| Elemental | Weight Percent* | |
|---|---|---|
| Impurity | Broad Range | Narrow Range |
| Niobium | 0–0.75 | 0.01–0.6 |
| Iron | 0–0.5 | 0.2–0.3 |

TABLE 1-continued

| Elemental Impurity | Weight Percent* Broad Range | Narrow Range |
|---|---|---|
| Chromium | 0–0.5 | 0.05–0.3 |
| Iron & Chromium | 0–0.5 | 0.15–0.3 |
| Copper | 0–0.5 | 0.02–0.2 |
| Nitrogen | 0–0.75 | 0.01–0.5 |

*Present in the alloy layer in the barrier 22.

Alloying with the elemental impurities can be achieved by conventional industrial techniques, such as ion implantation, ion plating, chemical vapor deposition, and the like. Typically, alloying will be accomplished by ion implantation at the tube shell stage after the zirconium sponge barrier 22 has been formed on the inside surface of the cladding container 17, as described above. Ion implantation is carried out at room temperature under vacuum conditions. The energy of ion implantation is adjusted so that the depth of penetration of the implanted ions into the sponge zirconium barrier is from about 0.1 to 1 microns.

The composite cladding tube 17 is then subjected to conventional tube reduction processes until the desired size of the cladding is achieved. At the final tubing size, the implanted layer will typically be on the order of from about 0.01 to 0.1 microns in thickness, while the overall zirconium barrier layer 22 will have a thickness which is typically about 75 microns. Since tube reduction fabrication is a constant volume process, the composition of the alloy layer will remain substantially unchanged during the tube reduction process.

Although the foregoing invention has been described in some detail by way of illustration and example for purposes of clarity of understanding, it will be obvious that certain changes and modifications may be practiced within the scope of the appended claims.

What is claimed is:

1. An improved nuclear fuel element of the type including a zirconium alloy tube, a zirconium barrier layer metallurgically bonded to the inside surface of the alloy tube, and a central core of nuclear fuel material partially filling the inside of said tube so as to leave a gap between said sponge zirconium barrier and said nuclear fuel material, said improvement comprising an alloy layer formed on the inside surface of the zirconium barrier layer, said alloy layer being composed of one or more impurities present in a thin layer region of the zirconium barrier in amounts less than 1% by weight but sufficient to inhibit the oxidation of said inside surface of the zirconium barrier layer without substantially affecting the plastic properties of said barrier layer, wherein said impurities are selected from the group consisting of iron, chromium, copper, nitrogen, and niobium.

2. An improved nuclear fuel element as in claim 1, wherein the zirconium alloy tube has a thickness in the range from about 500 to 1000 μm, the zirconium barrier layer has a thickness in the range from about 25 to 100 μm, and the thin layer region comprising alloy layer has a thickness from about 0.01 to 1.0 μm.

3. An improved nuclear fuel element as in claim 2, wherein at least one element is introduced by ion implantation, ion plating, or chemical vapor deposition.

4. An improved nuclear fuel element as in claim 2, wherein the elements are present in the alloy layer in the following amounts:
niobium at 0.01 to 0.6 percent by weight;
iron at 0.2 to 0.3 percent by weight;
chromium at 0.05 to 0.3 percent by weight;
iron and chromium mixture at 0.15 to 0.3 percent by weight; and
copper at 0.02 to 0.2 percent by weight.

5. An improved nuclear fuel element as in claim 1, wherein the zirconium barrier layer is high purity zirconium.

6. An improved nuclear fuel element as in claim 1, wherein the zirconium barrier layer is zirconium.

7. A method for treating a nuclear fuel composite cladding container to inhibit oxidation, said composite cladding container including a zirconium alloy tube and a zirconium barrier layer metallurgically bonded to the inner surface of the alloy tube, said method comprising introducing at least one impurity selected from the group consisting of iron, chromium, copper, nitrogen, and niobium into an inner surface of the zirconium barrier layer to form an alloy layer having increased oxidation resistance relative to said zirconium barrier, wherein no one of said impurities is present in an amount greater than 1% by weight in the alloy layer.

8. A method as in claim 7, wherein the zirconium alloy tube has a thickness in the range from about 500 to 1000 μm, the zirconium barrier layer has a thickness in the range from about 25 to 100 μm, and wherein the impurities are introduced to a sufficient depth to form an alloy layer having a thickness in the range from about 0.01 to 1.0 μm.

9. A method as in claim 7, wherein the impurities are introduced by ion implantation, ion plating or chemical vapor deposition.

10. A method as in claim 7, wherein the impurities are introduced so as to form an alloy layer having the following composition:
niobium at 0.01 to 0.6 percent by weight;
iron at 0.2 to 0.3 percent by weight;
chromium at 0.05 to 0.3 percent by weight;
iron and chromium mixture at 0.15 to 0.3 percent by weight; and
copper at 0.02 to 0.2 percent by weight.

* * * * *